United States Patent
Ito et al.

(10) Patent No.: US 9,164,217 B2
(45) Date of Patent: Oct. 20, 2015

(54) LINEAR LIGHT SOURCE AND PLANAR LIGHT SOURCE

(71) Applicant: Toyoda Gosei Co., Ltd., Kiyosu-shi (JP)

(72) Inventors: Yuhki Ito, Kiyosu (JP); Hitoshi Omori, Kiyosu (JP); Yuta Morimura, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 130 days.

(21) Appl. No.: 13/922,178

(22) Filed: Jun. 19, 2013

(65) Prior Publication Data

US 2014/0085927 A1 Mar. 27, 2014

(30) Foreign Application Priority Data

Sep. 27, 2012 (JP) ................................. 2012-214139

(51) Int. Cl.
| | |
|---|---|
| *F21V 7/04* | (2006.01) |
| *F21V 8/00* | (2006.01) |
| *F21K 99/00* | (2010.01) |
| *F21V 7/00* | (2006.01) |
| *F21Y 101/02* | (2006.01) |
| *F21Y 103/00* | (2006.01) |

(52) U.S. Cl.
CPC ............... *G02B 6/0031* (2013.01); *F21K 9/54* (2013.01); *F21V 7/0008* (2013.01); *F21V 7/0033* (2013.01); *G02B 6/002* (2013.01); *G02B 6/0028* (2013.01); *G02B 6/0068* (2013.01); *G02B 6/0073* (2013.01); *F21Y 2101/02* (2013.01); *F21Y 2103/003* (2013.01)

(58) Field of Classification Search
CPC ..... G02B 6/0031; G02B 6/0023; F21S 4/008; F21V 7/005; F21Y 2103/003
See application file for complete search history.

(56) References Cited

U.S. PATENT DOCUMENTS

| | | | | |
|---|---|---|---|---|
| 5,786,665 | A * | 7/1998 | Ohtsuki et al. | 313/512 |
| 8,057,084 | B2 * | 11/2011 | Song et al. | 362/612 |
| 2007/0109792 | A1 | 5/2007 | Chosa et al. | |
| 2007/0114555 | A1 * | 5/2007 | Takemoto et al. | 257/99 |
| 2009/0045423 | A1 * | 2/2009 | Hashimoto et al. | 257/98 |
| 2010/0080019 | A1 * | 4/2010 | Iwasaki | 362/628 |

FOREIGN PATENT DOCUMENTS

| | | |
|---|---|---|
| JP | 2004-235139 A | 8/2004 |
| JP | 2008-041567 | 2/2008 |
| JP | 2010-015709 A | 1/2010 |

OTHER PUBLICATIONS

Japanese Office Action dated Aug. 4, 2015 with a partial English translation.

* cited by examiner

*Primary Examiner* — Julie Bannan
(74) *Attorney, Agent, or Firm* — McGinn IP Law Group, PLLC.

(57) ABSTRACT

A linear light source includes a plurality of LED chips that are linearly arranged along a first direction, and a reflector including a first tapered sidewall sandwiching the LED chips in the first direction and a second tapered sidewall sandwiching the LED chips in a second direction intersecting with the first direction. The LED chips are surrounded by first tapered sidewall and second tapered sidewall, and the second tapered sidewall is lower than the first tapered sidewall.

20 Claims, 5 Drawing Sheets

1 PLANAR LIGHT SOURCE
20 LIGHT GUIDE PLATE
30
30 REFLECTION SHEET
10 LINEAR LIGHT SOURCE 1
30
20
30
10

LINEAR LIGHT SOURCE AND PLANAR LIGHT SOURCE

The present application is based on Japanese patent application No. 2012-214139 filed on Sep. 27, 2012, the entire contents of which are incorporated herein by reference.

BACKGROUND OF THE INVENTION

1. Field of the Invention

The invention relates to a linear light source and a planar light source.

2. Description of the Related Art

A conventional linear light source is known that is provided with LED chips linearly arranged in the longitudinal direction of the linear light source and a reflector for upwardly reflecting light horizontally emitted from the LED chips (see, e.g., JP-A-2004-235139 and JP-A-2010-15709).

The linear light source disclosed in JP-A-2004-235139 is constructed such that the reflector sandwiches each LED chip in the longitudinal direction of the linear light source and a reflection sheet is provided on sides along the longitudinal direction of the linear light source. Accordingly, of light horizontally emitted from the LED chip, light emitted in the longitudinal direction of the linear light source is reflected by the reflector and light emitted in the lateral direction of the linear light source is reflected by the reflection sheet.

The linear light source disclosed in JP-A-2010-15709 is constructed such that the reflector surrounds the LED chip. Accordingly, of the light horizontally emitted from the LED chip, both light emitted in the longitudinal direction of the linear light source and light emitted in the lateral direction of the linear light source are reflected by the reflector.

SUMMARY OF THE INVENTION

However, in the linear light source disclosed in JP-A-2004-235139, since the reflection sheet is disposed vertically to a surface to mount the LED chip, light horizontally emitted from the LED chip can be inputted back to the LED chip after it is reflected by the reflection sheet and fail to be extracted to the outside.

On the other hand, since the linear light source disclosed in JP-A-2010-15709 is provided with the reflector having a tapered portion to cause an increased thickness, it may prevent a decrease in thickness of the linear light source and a planar light source using thereof, etc. In general, the light reflectivity of the reflector is lower than that of the reflection sheet.

It is an object of the invention to provide a linear light source and a planar light source that are excellent in light extraction efficiency and suited to decrease in thickness.

(1) According to one embodiment of the invention, a linear light source comprises:

a plurality of LED chips that are linearly arranged along a first direction; and a reflector comprising a first tapered sidewall sandwiching the LED chips in the first direction and a second tapered sidewall sandwiching the LED chips in a second direction intersecting with the first direction, wherein the LED chips are surrounded by first tapered sidewall and second tapered sidewall, and wherein the second tapered sidewall is lower than the first tapered sidewall.

In the above embodiment (1) of the invention, the following modifications and changes can be made.

(i) A height of the second tapered sidewall is equal to or greater than a height of an upper edge of a light-emitting layer of the LED chips.

(ii) A height of the second tapered sidewall is equal to a height of an upper edge of the LED chips.

(2) According to another embodiment of the invention, a planar light source comprises:

the linear light source according to the above embodiment (1);

a light guide plate comprising a side to cover a light extraction surface of the linear light source and to input a light emitted from the linear light source therethrough to the plate and a top surface to output the light therethrough to an outside of the plate; and a reflection sheet covering at least a light passing section in a side along the first direction of the linear light source, the light passing section being defined between the second tapered sidewall and the light guide plate.

In the above embodiment (2) of the invention, the following modifications and changes can be made.

(iii) A light reflectivity of the reflection sheet is higher than that of the reflector.

(iv) The reflection sheet comprises a specular reflection-type reflection sheet.

Points of the Invention

According to one embodiment of the invention, a linear light source is constructed such that a second tapered sidewall of a reflector along the longitudinal direction (D1) of the linear light source is lower than a first tapered sidewall of the reflector along the lateral direction (D2) of the linear light source. Since the second tapered sidewall has a tapered portion, the thickness thereof increases with an increase in height so as to increase the thickness of the linear light source. The same goes for the planar light source using the linear light source. On the other hand, the light reflectivity of a reflection sheet is higher than that of the second tapered sidewall (reflector) and the light extraction efficiency thereof is higher than the case of reflecting by the second tapered sidewall. In a planar light source using the linear light source, the second tapered sidewall is covered by the reflection sheet up to the first tapered sidewall, light horizontally emitted in the lateral direction (D2) from an LED chip is reflected by the reflector and light emitted obliquely upward in the lateral direction (D2) from the LED chip is reflected by the reflection sheet. Due to this configuration, the planar light source is excellent in light extraction efficiency and suited to decrease in thickness.

BRIEF DESCRIPTION OF THE DRAWINGS

Next, the present invention will be explained in more detail in conjunction with appended drawings, wherein.

DESCRIPTION OF THE PREFERRED EMBODIMENTS

Embodiment

Figure 1A:
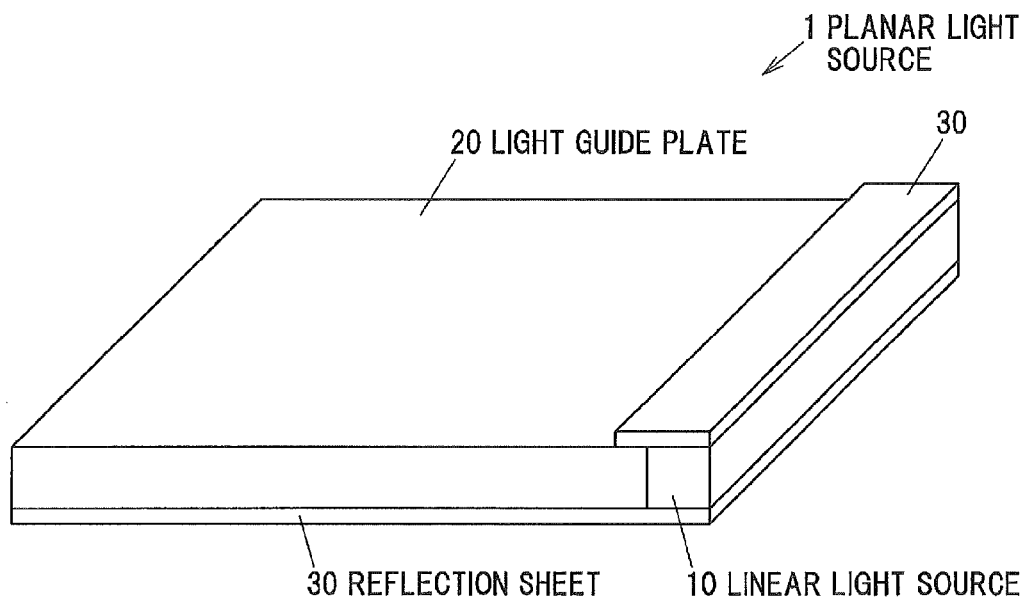
FIGS. 1A and 1B are perspective views showing planar light sources in an embodiment.

FIG. 1A is a perspective view showing a planar light source in the embodiment. A planar light source 1 has a linear light source 10, a light guide plate 20 provided so that a side surface thereof covers a light extraction surface of the linear light source 10, and reflection sheets 30 which cover one side of the light guide plate 20 and both sides of the linear light source 10.

Figure 2:
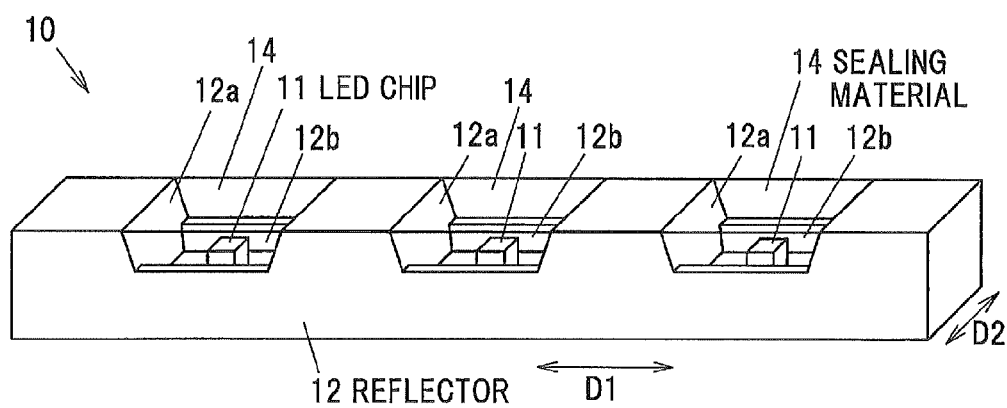
FIG. 2 is a perspective view showing a linear light source in the embodiment.

FIG. 2 is a perspective view showing the linear light source 10. The linear light source 10 has plural LED chips 11 linearly arranged along a first direction D1, a reflector 12 provided to surround each LED chip 11 and a sealing material 14 for sealing the LED chip 11. The reflector 12 is provided so that each LED chip 11 is sandwiched by first tapered sidewalls 12a in the first direction D1 and by second tapered sidewalls 12b in a second direction D2 which intersects with the first direction D1, and the height of the second tapered sidewall 12b is lower than that of the first tapered sidewall 12a.

Figure 3A:
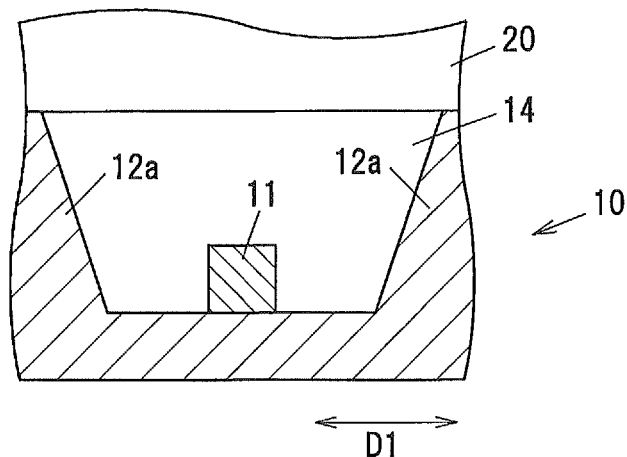
FIGS. 3A and 3B are vertical cross sectional views showing the planar light source, respectively taking along a first direction and a second direction.
Figure 3B:
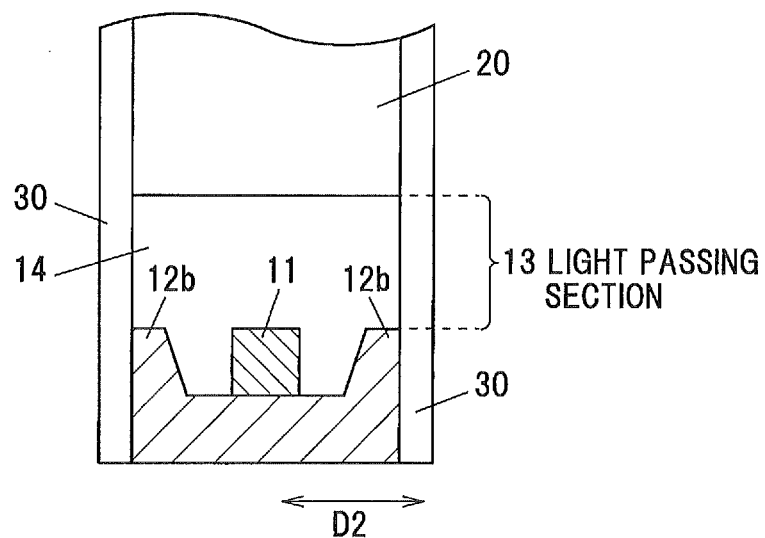

FIGS. 3A and 3B are vertical cross sectional views showing the planar light source 1, respectively taking along the first direction D1 and the second direction D2. Note that, a typical structure of the linear light source 10 is shown in FIGS. 2, 3A and 3B, where the first direction D1 coincides with a long axis direction and the second direction D2 is orthogonal to the first direction D1 and also coincides with a short axis direction of the linear light source 10 as viewed in a light-extracting direction.

The LED chip 11 is, e.g., a flip-chip or face-up LED chip and is connected to a non-illustrated conductive portion, such as a lead frame, of the linear light source 10. The LED chip 11 has a chip substrate and a crystal layer thereon which are not illustrated in the drawings. The crystal layer has a light-emitting layer which is sandwiched between an n-type semiconductor layer and a p-type semiconductor layer.

The reflector 12 has a function of upwardly reflecting light laterally emitted from the LED chip 11 (reflecting in a light-extracting direction), thereby improving light extraction efficiency of the linear light source 10. The reflector 12 is formed of, e.g., a resin material which contains light-reflecting particles such as titanium dioxide. For example, thermoplastic resins such as polyphthalamide resin, LCP (Liquid Crystal Polymer) or PCT (Polycyclohexylene Dimethylene Terephalate), etc., or thermosetting resins such as silicone resin, modified silicone resin, epoxy resin or modified epoxy resin, etc., are used as the resin material.

The height of the second tapered sidewall 12b is set to be equal to or higher than the upper edge of the light-emitting layer of the LED chip 11 so that light horizontally emitted from the LED chip 11 is reflected by the second tapered sidewalls 12b of the reflector 12. Alternatively, the height of the second tapered sidewall 12b may be set to be equal to or higher than the upper edge of the LED chip 11. In such a case, it is also possible to reflect the light horizontally emitted from the LED chip 11 and, in addition, it is easier to confirm the upper edge of the LED chip 11 than the upper edge of the light-emitting layer and it is thus easy to set height of the second tapered sidewall 12b.

The sealing material 14 is formed of, e.g., a resin material such as silicone-based resin or epoxy-based resin, etc., or glass. In addition, the sealing material 14 may contain phosphor particles. For example, when emission color of the LED chip 11 is blue and that of the phosphor contained in the sealing material 14 is yellow, emission color of the linear light source 10 and the planar light source 1 is white.

Figure 1B:
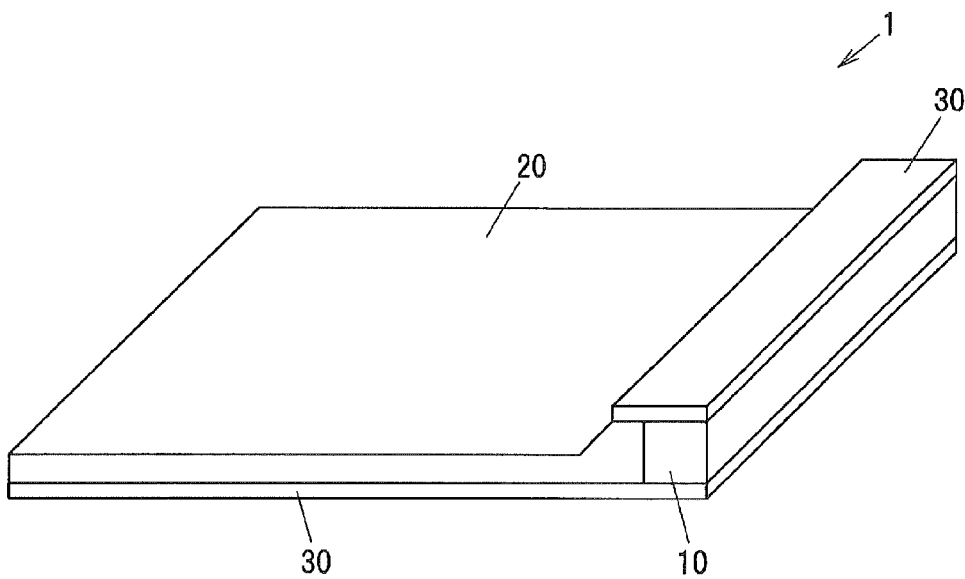

The light guide plate 20 is a rectangular plate formed of a translucent material such as acrylic resin, which takes light emitted from the linear light source 10 therein and emits the light in a top surface thereof. The light guide plate 20 may be a wedge-shaped plate having a cross section in which a surface-emitting portion is thinner than a portion for taking light from the linear light source 10 therein, as shown in FIG. 1B.

The reflection sheet 30 is, e.g., a multi-layer sheet formed of polyester. The reflection sheet 30 covers at least a light passing section 13 of a side surface in the first direction D1 of the linear light source 10 between the second tapered sidewall 12b and the light guide plate 20 so that light emitted from the LED chip 11 toward above the second tapered sidewall 12b of the reflector 12 is reflected.

Light reflectivity of the reflection sheet 30 is higher than that of the reflector 12. The reflection sheet 30 is preferably a specular reflection-type reflection sheet, not a diffuse reflection-type. In addition, the reflection sheet 30 is more susceptible to heat or light than the reflector 12 and is more likely to deteriorate due to light absorption.

Figure 4:
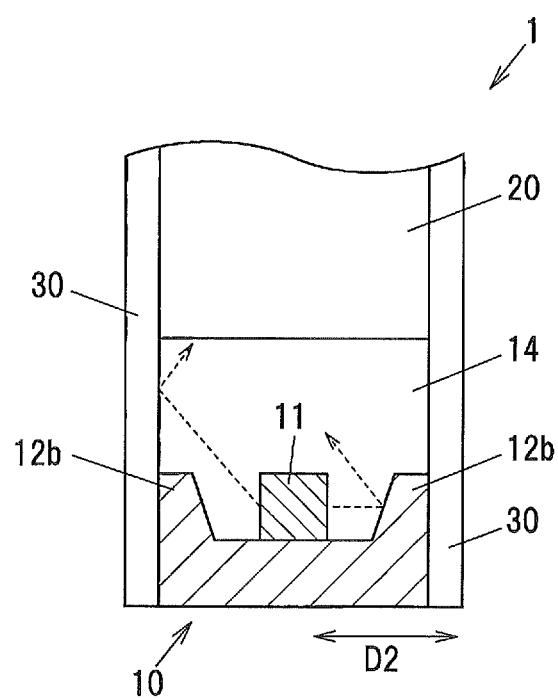
FIG. 4 is a vertical cross sectional view schematically showing a trajectory of light emitted from an LED chip of the planar light source in the embodiment.

FIG. 4 is a vertical cross sectional view schematically showing a trajectory of light emitted from the LED chip 11 of the planar light source 1. The cross section shown in FIG. 4 corresponds to the cross section shown in FIG. 3B.

As shown in FIG. 4, light horizontally emitted in the second direction D2 from the LED chip 11 is upwardly reflected by the second tapered sidewall 12b of the reflector 12 and does not return into the LED chip 11. In addition, due to reflection by the second tapered sidewall 12b, such light travelling at an angle nearly vertical to the reflection sheet 30 is not absorbed by the reflection sheet 30 and thus does not cause deterioration of the reflection sheet 30.

In addition, as shown in FIG. 4, light emitted obliquely upward in the second direction D2 from the LED chip 11 is upwardly reflected by the reflection sheet 30. Such light having a large incident angle with respect to the reflection sheet 30 is hardly absorbed by the reflection sheet 30 and does not cause deterioration of the reflection sheet 30. In addition, such light does not travel toward the LED chip 11 after being reflected by the reflection sheet 30. Meanwhile, since light reflectivity of the reflection sheet 30 is higher than that of the reflector 12, light extraction efficiency is larger than the case of reflecting by the reflector 12.

Figure 5A:
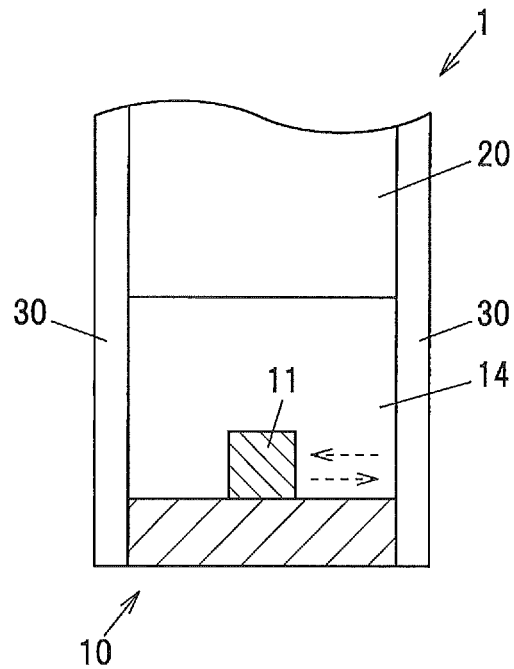
FIGS. 5A and 5B are vertical cross sectional views schematically showing trajectories of lights emitted from LED chips of planar light sources in Comparative Examples.

FIG. 5A schematically shows a trajectory of light in Comparative Example in which the reflector 12 does not have the second tapered sidewall 12b. The cross section shown in FIG. 5A corresponds to the cross section shown in FIG. 4. In this case, the light horizontally emitted in the second direction D2 from the LED chip 11 may return into the LED chip 11 by being reflected by the reflection sheet 30, as shown in FIG. 5A. In addition, such light is incident on the reflection sheet 30 at an angle close to vertical and is thus likely to be absorbed by the reflection sheet 30. In general, the reflection sheet is more likely to deteriorate due to light absorption and to be subjected to a decrease in reflectance as compared to the reflector. Therefore, light incident on the reflection sheet 30 at an angle close to vertical is not preferable.

Figure 5B:
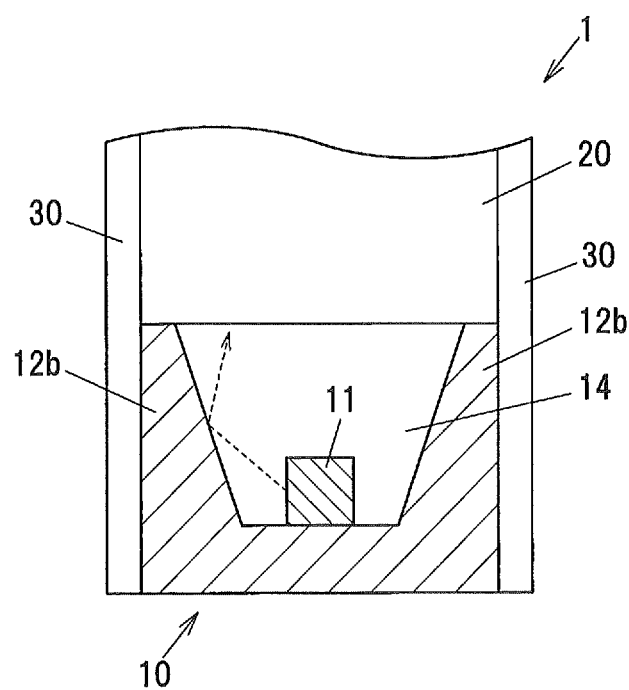

Furthermore, FIG. 5B schematically shows a trajectory of light in another Comparative Example in which the height of the second tapered sidewall 12b is equal to that of the first tapered sidewall 12a. The cross section shown in FIG. 5B corresponds to the cross section shown in FIG. 4. In this case, the light emitted obliquely upward in the second direction D2 from the LED chip 11 is upwardly reflected by the second tapered sidewall 12b, as shown in FIG. 5B. However, the light reflectivity of the second tapered sidewall 12b is lower than that of the reflection sheet 30 and light extraction efficiency is therefore lower than the case of reflecting by the reflection sheet 30. In addition, since the second tapered sidewall 12b has a tapered portion, the thickness thereof increases with an increase in height, which increases the thickness of the planar light source 1.

Effects of the Embodiment

In the embodiment, by providing the second tapered sidewall 12b of which height is lower than the first tapered sidewall 12a, the light horizontally emitted in the second direction D2 from the LED chip 11 is reflected by the reflector 12 and the light emitted obliquely upward in the second direction D2 from the LED chip 11 is reflected by the reflection sheet 30. Due to such a configuration, a linear light source and a planar light source using thereof are excellent in light extraction efficiency and are suitable for thinning. In addition, it is possible to suppress deterioration of the reflection sheet 30.

The present invention is not intended to be limited to the above-mentioned embodiment, and the various kinds of modifications can be implemented without departing from the gist of the invention.

In addition, the invention according to claims is not to be limited to the above-mentioned embodiment. Further, please note that all combinations of the features described in the embodiment are not necessary to solve the problem of the invention.

What is claimed is:

1. A linear light source, comprising:
    a plurality of LED chips that are linearly arranged along a first direction; a reflector comprising a first tapered sidewall sandwiching the LED chips in the first direction and a second tapered sidewall sandwiching the LED chips in a second direction intersecting with the first direction; and
    a sealing member for sealing the plurality of LED chips, the sealing member being formed higher than the second tapered sidewall,
    wherein the LED chips are surrounded by first tapered sidewall and second tapered sidewall, and
    wherein the second tapered sidewall is lower than the first tapered sidewall.

2. The linear light source according to claim 1, wherein a height of the second tapered sidewall is equal to or greater than a height of an upper edge of a light-emitting layer of the LED chips.

3. The linear light source according to claim 1, wherein a height of the second tapered sidewall is equal to a height of an upper edge of the LED chips.

4. A planar light source, comprising:
    the linear light source according to claim 1;
    a light guide plate comprising a side to cover a light extraction surface of the linear light source and to input a light emitted from the linear light source therethrough to the plate and a top surface to output the light therethrough to an outside of the plate; and
    a reflection sheet covering at least a light passing section in a side along the first direction of the linear light source, the light passing section being defined between the second tapered sidewall and the light guide plate.

5. The planar light source according to claim 4, wherein a light reflectivity of the reflection sheet is higher than that of the reflector.

6. The planar light source according to claim 4, wherein the reflection sheet comprises a specular reflection-type reflection sheet.

7. The linear light source according to claim 1, wherein the reflector continuously extends in the first direction to embed the plurality of the LED chips.

8. The linear light source according to claim 1, wherein the reflector continuously extends in the first direction to embed each of the plurality of the LED chips in a single resin material of the reflector.

9. The linear light source according to claim 8, wherein the resin material continuously extends in the first direction from an edge of the linear light source to another edge of the light source.

10. The linear light source according to claim 9, wherein a bottom surface of the resin material continuously extends in the first direction below said each of the plurality of the LED chips.

11. The linear light source according to claim 10, wherein an upper surface of the resin material continuously extends in the first direction from the first tapered sidewall of one of the LED chips to the first tapered sidewall of another one of the LED chips.

12. The linear light source according to claim 1, wherein the reflector continuously extends in the first direction from an edge of the linear light source to another edge of the light source.

13. The linear light source according to claim 12, wherein each of the plurality of the LED chips is embedded in the reflector.

14. The linear light source according to claim 13, wherein a bottom surface of the reflector continuously extends in the first direction below said each of the plurality of the LED chips.

15. The linear light source according to claim 14, wherein an upper surface of the reflector continuously extends in the first direction from the first tapered sidewall of one of the LED chips to the first tapered sidewall of another one of the LED chips.

16. The linear light source according to claim 1, wherein a bottom surface of the reflector continuously extends in the first direction below each of the plurality of the LED chips.

17. The linear light source according to claim 16, wherein an upper surface of the reflector continuously extends in the first direction from the first tapered sidewall of one of the LED chips to the first tapered sidewall of another one of the LED chips.

18. The planar light source according to claim 4, wherein the reflector continuously extends in the first direction from an edge of the linear light source to another edge of the light source.

19. The planar light source according to claim 18, wherein each of the plurality of the LED chips is embeded in the reflector.

20. The linear light source according to claim 19, wherein a bottom surface of the reflector continuously extends in the first direction below said each of the plurality of the LED chips, and
    wherein an upper surface of the reflector continuously extends in the first direction from the first tapered sidewall of one of the LED chips to the first tapered sidewall of another one of the LED chips.

\* \* \* \* \*